Sept. 8, 1959 H. B. BABSON 2,902,975
AUTOMATIC SHUTOFF MILKER
Filed June 11, 1956 2 Sheets-Sheet 1
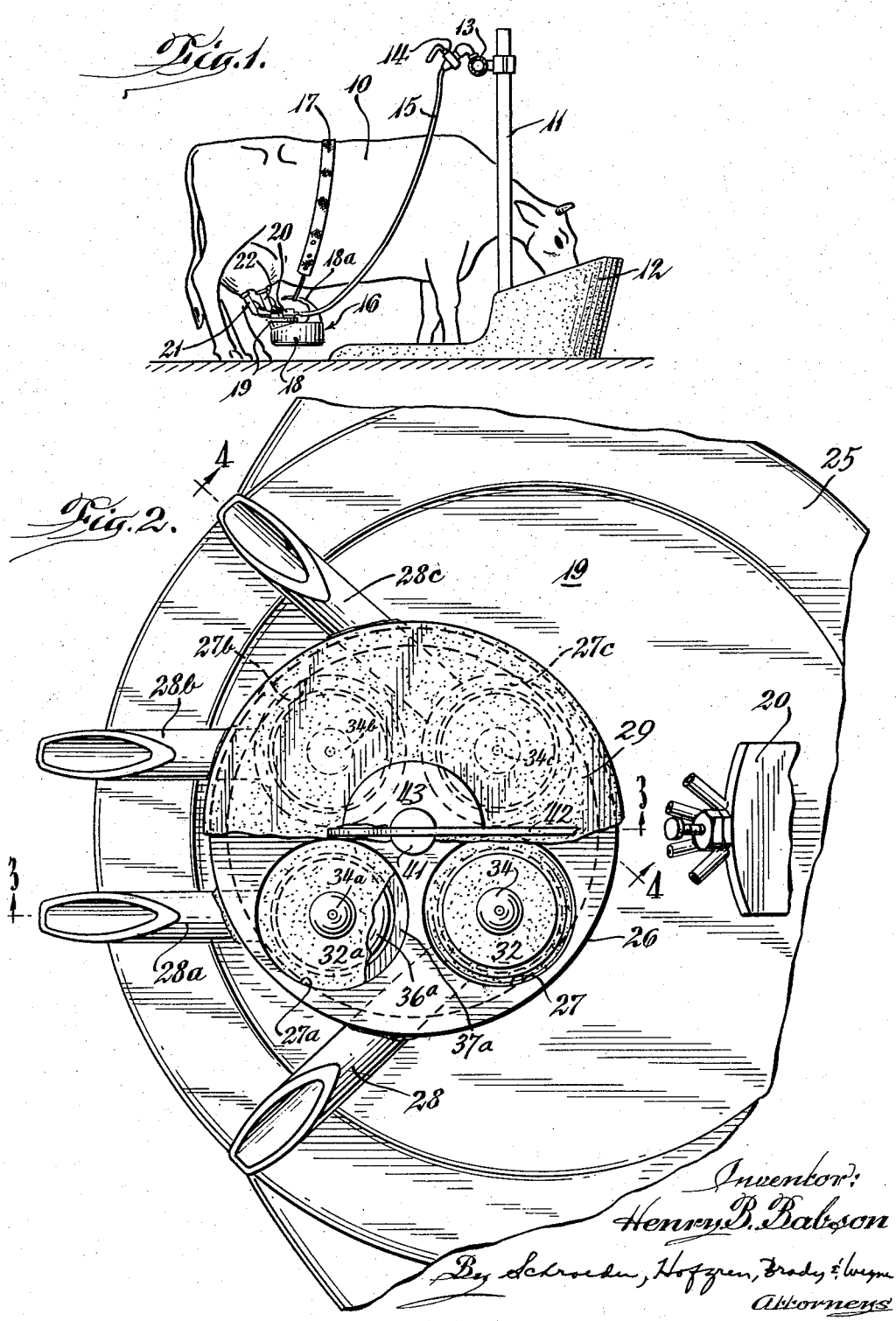
Inventor:
Henry B. Babson
By Schroeder, Hofgren, Brady & Wegner
Attorneys

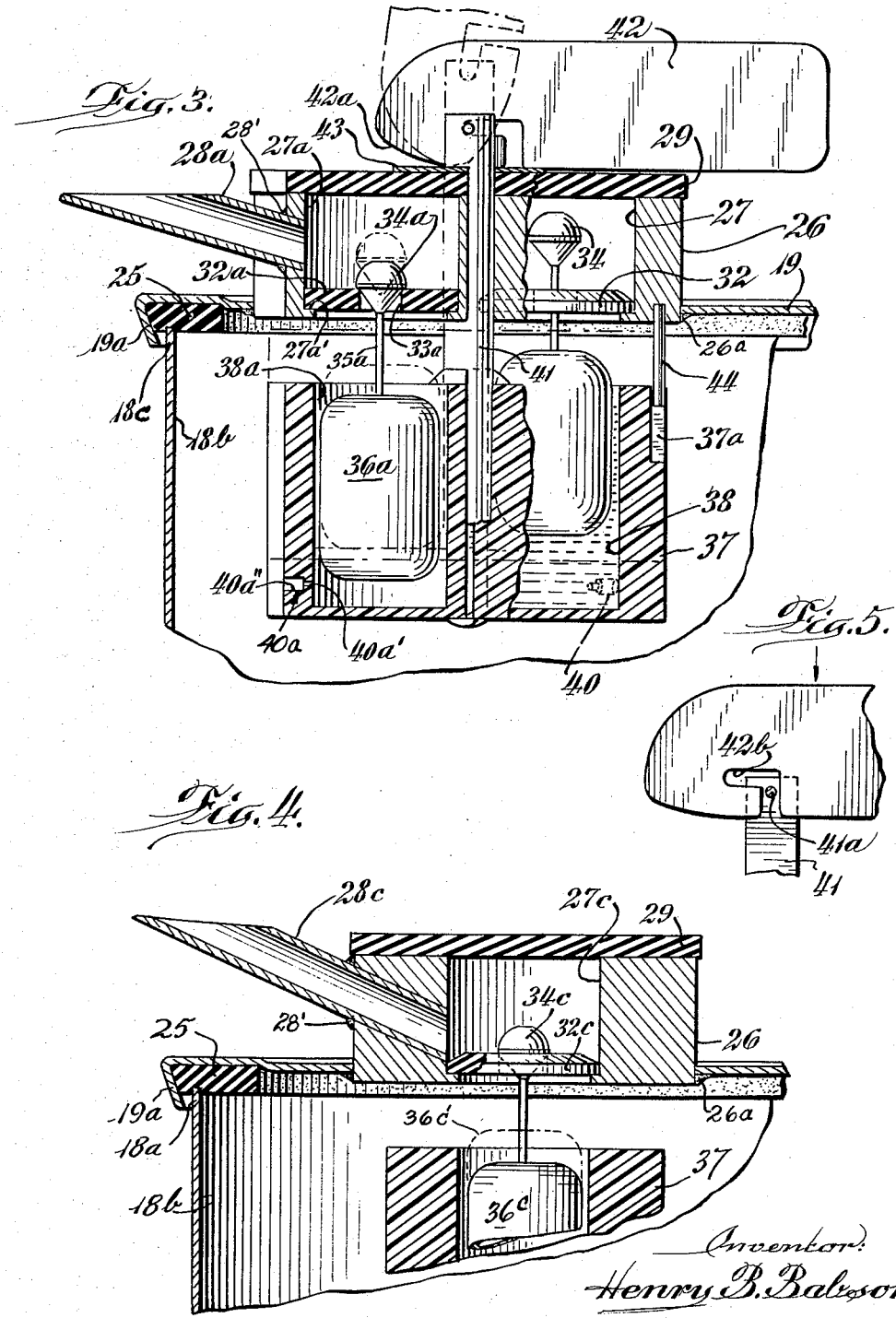

United States Patent Office 2,902,975
Patented Sept. 8, 1959

2,902,975

AUTOMATIC SHUTOFF MILKER

Henry B. Babson, Chicago, Ill., assignor to Babson Bros. Co., a corporation of Illinois Application June 11, 1956, Serial No. 590,667

14 Claims. (Cl. 119—14.43)

This invention is concerned with a milking apparatus and more particularly with an automatic shutoff milker.

Present day milking machines utilize what is commonly referred to as "double-action" milking. In double-action milking the animal's teat is inserted in a flexible inflation and a continuous vacuum is applied to the end of the teat while the inflation is alternately expanded and collapsed. During the expanded portion of the cycle, milk is withdrawn by the action of the vacuum applied to the end of the teat. The portion of the cycle during which the inflation is collapsed is a rest period, the collapsed inflation closing off the teat canal and massaging the teat providing a desired stimulation. So long as milk continues to flow from the teat, vacuum is not applied to the interior of the teat canal or the interior of the udder. However, when the cow has milked out, the continuous vacuum is applied to these interior surfaces and may cause injury to the animal. Accordingly, it is desirable to provide a milking apparatus which interrupts the vacuum applied to the teat automatically when the animal is milked out.

It is a principal object of this invention to provide a new and improved automatic shutoff milker, and particularly one which is positive in operation yet easy to disassemble for cleaning.

One feature of the invention is the provision in an automatic shutoff milker of means defining a plurality of milk flow passages connectable with an animal's teats, means operatively connected to said flow passages for maintaining a vacuum therein, valve means in each of the flow passages and each movable between a first position in which the valve means closes the associated passage between the animal's teat and the source of vacuum and a second position in which the passage is open, means associated with each valve means and responsive to the flow of milk from the animal to maintain the valve means in the second position only in the presence of milk, and valve actuating means operatively associated with the valve means and movable in the direction of movement of the valve means between the first and second position, movement of the actuating means toward the second position opening the valve means in each of the passageways. Another feature is the provision of such an automatic shutoff milker including means defining a milk receptacle, a cover member for the milk receptacle through which the milk flow passage extends and in which the valve actuating means is carried within the milk receptacle. A further feature is that the valve actuating means is provided with an operating element which extends through the cover member and is manually engageable from above for effecting movement thereof and of the movable actuating means.

Still another feature is the provision in an automatic milker of means defining a milk flow passage connectable with an animal's teat, means operatively connected with the flow passage for maintaining a vacuum therein, a valve in the flow passage and movable between a first position in which the valve closes the passage between the animal's teat and the source of vacuum and a second position in which the passage is open, a float operably associated with the valve for maintaining the valve in the second position only in the presence of milk, and a movable member having a chamber therein for receiving milk from the passageway, the float being positioned in the chamber and the member being movable in the direction of movement of the valve means between the first and second positions, movement of the member toward the second position engaging the float and opening the valve means.

Yet a further feature is the provision of such a milker including means defining a milk receptacle having an opening therein, a cover member for the receptacle, a housing on the cover member, defining a milk receptacle having an opening therein, a cover member for the receptacle, a housing on the cover member defining a valve chamber communicating with the receptacle, means defining a milk flow passage operably connectable between an animal's teat and the housing, means operably connected for maintaining a vacuum in the receptacle and passage, means in the valve chamber including a valve member movable between a first position in which the valve closes the passage between the animal's teat and the source of vacuum and a second position in which the passage is open, the valve member having an actuating element extending through the opening into the milk receptacle, a float connected with the actuating element for maintaining the valve in the second position in the presence of milk, and a movable member carried within the receptacle and having a float chamber therein receiving the float, movement of the member toward the second valve position causing the member to engage the float and open the valve.

Further features and advantages will readily be apparent from the following specification and from the drawings, in which:

Figure 1 is a side elevational view of a milking apparatus embodying the invention in place on an animal;

Figure 2 is an enlarged, fragmentary top plan view, with a portion broken away, of the milking apparatus;

Figure 3 is a fragmentary sectional view taken substantially along line 3—3 of Figure 2;

Figure 4 is a fragmentary sectional view taken substantially along line 4—4 of Figure 2, and illustrating a modification; and Figure 5 is an enlarged fragmentary detail view of the operating mechanism.

Turning now to Figure 1 of the drawings, a cow 10 is shown in a stall of a stanchion-type milking barn, the cow being restrained in the stall as by a suitable stanchion 11. A trough 12 is provided to permit feeding during milking. A vacuum line 13 runs along the top of stanchion 11 and is connected through valve 14 and flexible hose 15 with a bucket type milking apparatus, indicated generally as 16, suspended beneath the cow from a surcingle 17. The milking apparatus, which is of the general type disclosed in McCornack Patent 1,859,213, includes a bucket 18 having a handle 18a by which it is suspended from the surcingle 17. A cover member or lid 19 closes the opening provided in the top of the bucket and has mounted thereon a pulsator 20 to which the vacuum hose 15 is connected. Four teat cup assemblies, as 21 and 22 are connected with the lid 19 and are applied to the animal's teats. Further details regarding the structure and general operation of the milking apparatus may be found in the aforementioned McCornack patent.

While the present invention is illustrated in connection with the bucket type milker, and it is believed that its most important application is with such milkers, it may also be used with other milking systems, as the carry-away walking system shown in Thomas Patent 2,709,416, the lid shown herein merely being applied to the bowl-type milk receptacle shown in the Thomas patent.

Turning now to Figures 2, 3 and 4, the lid 19 is seen to be a generally flat member having a downturned flange 19a around the periphery thereof and within which a resilient sealing gasket 25 is carried, the gasket making an air-tight seal with the upper rim portion 18c which defines the opening 18b in the top of bucket 18. The pulsator 20 is mounted on a post at the front portion of the lid, which post is preferably hollow and provides communication between the pulsator and the interior of bucket 18 by virtue of which the interior of the bucket is evacuated through the same hose connection 15 which supplies vacuum to the pulsator. The front and rear portions of the lid, as used herein, are designated with relation to the head and tail of the cow when the milking apparatus is in place, the front being toward the head of the cow and the rear toward the tail. Further details of this arrangement may be found in Babson Patent 2,464,917.

A housing 26 is secured to lid 19, as by soldering at 26a, and extends above the surface of the lid adjacent the rear edge thereof and has formed therein four chambers 27, 27a, 27b and 27c. Securely mounted in the housing block, as by soldering at 28' are four nipples, 28, 28a, 28b and 28c which extend through the block and communicate with the chambers 27, 27a, 27b and 27c, respectively. The nipples are adapted to have connected thereto the milk tubes of the inflation portions of the teat cup assemblies and direct the milk flow from the individual quarters of the animal into the chambers.

Referring now particularly to Figures 3 and 4, it is seen that the chambers in housing 26 are open at the top and that the top is closed by a member 29 which is preferably a diaphragm of resilient material, as a synthetic rubber. Each of the chambers 27, 27a, 27b and 27c is open at the bottom to provide communication with the interior of the bucket 18. Considering only chamber 27a, the other chambers being similar, an inwardly extending shoulder 27a' provided at the bottom of each chamber supports a disc 32a which has a centrally disposed flow passage 33a therethrough. Valve member 34a is adapted to cooperate with the disc or valve seat 32a closing the flow opening 33a when the valve is in the lower or solid line position, interrupting the vacuum applied to the animal's teat. Each of the valves, as valve 34a, is provided with an operating stem 35a to which is attached a float 36a. The disc is preferably of a resilient synthetic rubber and the valve member of a plastic as Lucite. Furthermore, the valve member is tapered to insure a good seal.

Mounted within bucket 18 and below housing 26 is a block 37, preferably of a plastic material such as Lucite, which has formed therein four float receiving chambers corresponding with the four chambers of the housing 26. As exemplified by chambers 38 and 38a in Figure 3, the float receiving chambers are disposed directly below corresponding valve chambers in housing 26. Assuming that milk is flowing from all quarters of the animal, it flows into the valve chambers through the flow openings, as 33a and into each of the float chambers in block 37 which are thus kept filled with milk and the shutoff valves are held open due to the buoyancy of the floats. The milk overflows from the float chambers into the interior of the milk bucket. When the milk flow ceases, as each quarter is milked out, the milk in the float chamber drains therefrom through a small drain hole, as drain holes 40 and 40a. As the float chambers empty the associated floats drop until the valve is closed, as the valve 34a shown in solid lines in Figure 3. After each quarter is milked out, all of the valves close and the milking apparatus may be removed, the bucket emptied and readied for the next animal.

In order to initiate operation with this milking apparatus, it is necessary to provide an arrangement for opening each of the float controlled valves 34, 34a, 34b and 34c to apply vacuum to the animal's teats. The block 37 is carried on an operating element or a rod 41 which extends upwardly through the lid 19, valve housing block 26 and cover diaphragm 29, projecting above the cover diaphragm. The block 37 is adapted for vertical reciprocating movement, and when moved upwardly in the direction of the opening movement of the valves, engages each of the floats, lifting it and its associated valve. The raised position of block 37 and of valve 34a and its associated float 36a are shown in broken lines in Figure 3. An actuating arm or lever 42 is readily detachably secured to the upper end of operating element 41 and may be manually moved to the broken line position of Figure 3 in order to raise the float block. In the embodiment shown, the upper end of operating element 41 is slotted and provided with a transverse pin 41a (Figure 5) actuating member 42 has formed therein an L-shaped slot 42b which may readily be slipped about pin 41a to provide a readily separable connection. The rounded camming edge 42a of the actuating member bears on a washer 43, preferably of metal, seated on top of diaphragm 29. A pin 44 projects downwardly from the underside of the lid 19 and into a guide groove 47a formed in the float block insuring a desired alignment between the valve chambers and the float chambers.

In operation, the apparatus will be readied for application to the animal by lifting the actuating member 42 to the broken line position, opening each of the automatic shutoff valves 34, 34a, 34b and 34c. The milker pail 18 is then suspended from surcingle 17, or this may be done prior to opening of the valves, and the individual teat cups, as 21 and 22 are applied to the animal's teats. Within a few seconds milk begins to flow from each of the four quarters of the animal through the milk tubes of the associated milk withdrawing assemblies, into the valve chambers, then down through the flow openings and into the associated float chambers. As soon as milk fills each of the float chambers, holding each valve open, the actuating member 42 may be returned to the solid line position (Figure 3) whereupon the float chamber block 37 returns to the lower position shown in Figure 3. The weight of the plastic block 37 may in itself be sufficient to return it to the lower position, despite the friction between operating element 41 and valve chamber housing block 26 and cover diaphragm 29. In any event, several pounds of downward pressure are applied to the float block by virtue of the fact that the operating element 41 extends upwardly into the atmosphere and has an end portion exposed to atmospheric pressure. While the diameter of this element is relatively small, of the order of ⅜ of an inch, the pressure differential between the interior of the bucket and atmosphere results in the application of several pounds of pressure tending to move the block downwardly.

As the individual quarters of the cow are milked out the milk will drain from each of the float chambers permitting the individual valves to close and relieving the vacuum applied to the animal's teats. The restricted size of the small drain holes, as drain hole 40a provides a predetermined time lapse between the cessation of the flow of milk and the closing of the valve. This prevents the milker from shutting off upon a temporary let up of the flow of milk and also provides a period of stripping action at the end of the milking operation. The drain holes are preferably so related to the size of the float chambers that about fifteen seconds after the cessation of milk flow are required to empty the chambers sufficiently to permit the valves to close.

One of the primary problems with automatic shutoff milkers which have heretofore been proposed is that they are difficult to disassemble, wash properly and reassemble. This is important as it is necessary for proper sanitation that milking equipment be washed thoroughly after each milking. The structure of the present invention may readily be disassembled and is easily washed. The first step in disassembly is to remove actuating member 42 by disengaging it from the actuating stem 41. Washer 43 and cover diaphragm 29 may then be lifted off and the block 37 removed by withdrawing stem 41 from valve chamber housing 26. Each of the valve float assemblies and the associated valve seats may be removed through the open top of the valve chambers. After each of the parts has been thoroughly washed, the lid may be reassembled by reversing the foregoing steps.

In connection with the drain openings and referring particularly to opening 40a, it will be noted that the opening has portions of two different diameters. The smaller diameter portion 40a' is adjacent the inner extremity of the drain passage, where it joins the float chamber and the larger portion 40a" is at the outer extremity which opens into the interior of the milk bucket. The smaller portion 40a' of the opening regulates the drainage of milk from the float chamber while this portion is relatively short in extent and thus reduces the possibility of the drain hole clogging as a result of small particles or foreign matter in the milk.

It will be noted that in the two valve chambers 27 and 27c the valve seat discs 32 and 32c respectively are chamfered along their upper edge, while this is not done to the valve seats 32a and 32b in chambers 27a and 27b. This results from the fact that the nipples 28 and 28c connected with valve chambers 27 and 27c must pass through a larger extent of housing wall before they enter the chamber. Accordingly the outlet end of these nipples is somewhat lower than the outlet end of nipples 28a and 28b and, in order to avoid blocking part of this outlet opening the discs 32 and 32c are so chamfered.

It should be noted that the total valve area exposed to vacuum, that is the area of the lower faces of the valves 34, 34a, 34b and 34c is relatively small, each valve having a diameter of the order of ¼ inch. This permits the valves to be opened simultaneously without the application of a large force. In the embodiment illustrated and with a vacuum of the order of fourteen inches in the milker bucket about two pounds pressure is required to open the valves. If desired, the length of the valve operating stems, as 35a, may be varied as indicated by the broken line showing of float 36c', Figure 4, to permit the valves to be opened sequentially rather than all at once, further reducing the required opening force.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In an automatic shutoff milker: means defining a milk flow passage connectable with an animal's teat; means operatively connected to said flow passage for maintaining a vacuum therein; a valve in said flow passage and movable between a first position in which the valve closes the passage between the animal's teat and the source of vacuum and a second position in which the passage is open; a float operably associated with said valve for maintaining the valve in the second position only in the presence of milk; and a movable member having a chamber therein for receiving milk from said passageway, said float being positioned in said chamber, and said member being movable in the direction of movement of the valve means between the first and second positions, movement of the member toward the second position engaging the float and opening the valve means.

2. In an automatic shutoff milker of the character described in claim 1, a valve seat comprising a washer member supported on a shoulder provided at the lower end of said valve chamber, and having a flow opening therethrough, the valve having a stem extending downwardly through said flow opening, with the float mounted thereon.

3. The automatic shutoff milker apparatus of claim 1, wherein the chamber in the movable member has a primary outlet for milk at an upper portion thereof and has a wall with a bottom portion, there being a drain opening formed in the lower portion of the wall adjacent the bottom portion, the drain opening having one diameter at its inner extremity and a larger diameter at its outer extremity.

4. The automatic shutoff milker apparatus of claim 1, wherein an actuating cam member is operably connected with the said movable member for effecting movement thereof.

5. In an automatic shutoff milker: means defining a plurality of milk flow passages connectable with an animal's teats; means operatively connected with said flow passages for maintaining a vacuum therein; a valve in each of said flow passages and each movable between a first position in which the valves close the associated passages between the animal's teats and the source of vacuum and a second position in which the passages are open; a float connected with each valve for maintaining the valve in said second position in the presence of milk; a movable member having formed therein a plurality of float chambers positioned to receive milk from said flow passages, one operably associated with each of said floats, said member being movable in the direction of movement of said valves between said first and second positions, movement of said member toward the second position opening each of said valves.

6. In an automatic shutoff milker: means defining a milk receptacle having an opening therein; a cover member for said receptacle; means defining a milk flow passage connectable with an animal's teat and extending through said cover member; means operably connected with said receptacle for maintaining a vacuum in said receptacle and milk passage; a valve in said flow passage, movable between a first position in which the valve closes the passage between the animal's teat and the source of vacuum and a second position in which the passage is open; a float operably connected with said valve and responsive to the flow of milk from the animal to maintain the valve in the second position only in the presence of milk; a movable member carried by said cover, positioned within said receptacle and having a chamber therein within which said float is received, said member being movable in the direction of movement of said valve between the first and second positions, movement of the member toward the second valve position engaging said float and opening the valve.

7. In an automatic shutoff milker: means defining a milk receptacle having an opening therein; a cover member for said receptacle; means defining a milk flow passage connectable with an animal's teat and extending through said cover member; means operably connected with said receptacle for maintaining a vacuum in said receptacle and milk passage; a valve in each of said flow passages, each valve being movable between a first position in which the valve closes the passage between the animal's teat and said source of vacuum and a second position in which the passage is open; a float associated with each valve and responsive to the flow of milk from the animal to maintain each valve in the second position only in the presence of milk; a block carried within said receptacle and beneath the inwardly extending ends of said flow passages, said block having a plurality of chambers formed in the upper surface thereof, one receiving each float, said block being removable in the direction of movement of said valves between the first and second positions, movement of said block toward the second valve position causing the block to engage said floats, opening said valves; and an operating element for said block, said operating element extending through said cover member and manually engageable from above for effecting movement thereof and of the movable block.

8. In an automatic shutoff milker; means defining a milk receptacle having an opening therein; a cover member for said receptacle; a housing on said cover member, defining a valve chamber communicating with said receptacle; means defining a milk flow passage operably connectable between an animal's teat and said housing; means operably connected with said receptacle for maintaining a vacuum in said receptacle and said passage; valve means in said valve chamber including a valve member movable between a first position in which the valve closes the passage between the animal's teat and the source of vacuum and a second position in which the passage is open; said valve member having an actuating element extending through said opening into the milk receptacle; a float connected with said actuating element for maintaining the valve in the second position in the presence of milk; and a movable member carried within said receptacle and having a float chamber therein receiving said float, movement of said member toward the second valve position causing said member to engage said float and open said valve.

9. In an automatic shutoff milker: means defining a milk receptacle having an opening therein; a cover member for said receptacle; an open-topped housing in said cover member defining a valve chamber; means defining a milk flow passage operably connectable between an animal's teat and said housing; means operably connected with said receptacle for maintaining a vacuum in said receptacle and said passage; valve means in said valve chamber including a valve member movable between a first position in which the valve closes the passage between the animal's teat and the source of vacuum and a second position in which the passage is open; a float connected with said valve member for maintaining the valve in the second position in the presence of milk; a movable member carried within said receptacle and having a float chamber therein receiving said float, movement of said member toward the second valve position causing said member to engage said float and open said valve; and a readily removable resilient cover member for the open-topped housing.

10. Apparatus of the character described in claim 9, wherein said movable member is provided with an actuating stem, said actuating stem extending through said cover member, and a readily detachable operating member connected with said stem for effecting movement of said movable member toward said second valve position.

11. The automatic shutoff milker of claim 9, wherein said movable member is provided with an operating element extending through said resilient cover member, and an actuating member is pivotally connected at an intermediate point with the operating element and has a rounded cam surface movable into engagement with a surface of said cover for effecting longitudinal movement of the operating element to cause movement of the movable member toward the second valve position, opening the valve means.

12. In an automatic shutoff milker: means defining a milk receptacle having an opening therein; a cover member for said receptacle; a housing on said cover member defining a plurality of valve chambers; means defining a plurality of milk flow passages operably connectable between an animal's teats and said chambers; means operably connected with said receptacle for maintaining a vacuum in said receptacle and said passages; a valve member in each of said chambers and movable between a first position in which the valve closes the passage between the animal's teat and the source of vacuum and the second position in which the passage is open; a float connected with each of said valve members for maintaining the valves in the second position in the presence of milk; and a movable member carried within said receptacle and having a plurality of float chambers therein, positioned beneath said valve chambers and receiving said floats, movement of said member toward the second valve position causing the member to engage said floats and open said valves.

13. In an automatic shutoff milker: means defining a milk receptacle; a cover member for said receptacle; a housing on said cover member defining a plurality of valve chambers; means defining a plurality of milk flow passages operably connectable between an animal's teats and said chambers; means operably connected with said receptacle for maintaining a vacuum in said receptacle and said passages; a valve member in each of said chambers and movable between a first position in which the valve closes the passage between the animal's teat and the source of vacuum and the second position in which the passage is open; a float connected with each of said valve members for maintaining the valves in the second position in the presence of milk; a movable member carried within said receptacle and having a plurality of float chambers therein, positioned beneath said valve chambers and receiving said floats, movement of said member toward the second valve position causing the member to engage said floats and open said valves; an actuating stem on said movable member extending through said cover member; and a readily detachable operating member connected with said stem for effecting movement of said movable member toward said second valve position.

14. In an automatic shutoff milker: means defining a plurality of milk flow passages connectable with an animal's teats; means operatively connected to said flow passages for maintaining a vacuum therein; a valve assembly in each of said flow passages and each movable between a first position in which a valve member closes the associated passage between the animal's teat and source of vacuum and a second position in which the passage is open, and including means associated with each valve member and responsive to the flow of milk from the animal to maintain the valve in the second position only in the presence of milk; and a single valve actuating member operatively associated with said valve assemblies and movable in the direction of movement of said valve members between said first and second positions, movement of the actuating means toward the second position sequentially bringing it into engagement with each of said valve assemblies, sequentially opening each of the valves one at a time.

References Cited in the file of this patent

UNITED STATES PATENTS

| 2,445,904 | Bloemers | July 27, 1948 |
| 2,685,862 | Hill et al. | Aug. 10, 1954 |

FOREIGN PATENTS

| 27,102 | Denmark | Jan. 5, 1921 |
| 109,446 | Australia | Dec. 22, 1939 |